Aug. 21, 1962  A. REDDING, JR  3,050,645
SUBMERSIBLE MOTOR STRUCTURE
Filed May 12, 1958  2 Sheets-Sheet 1

INVENTOR.
ALBERT REDDING, JR.
BY
Ham and Ham
ATTORNEYS.

Aug. 21, 1962  A. REDDING, JR  3,050,645
SUBMERSIBLE MOTOR STRUCTURE
Filed May 12, 1958  2 Sheets-Sheet 2
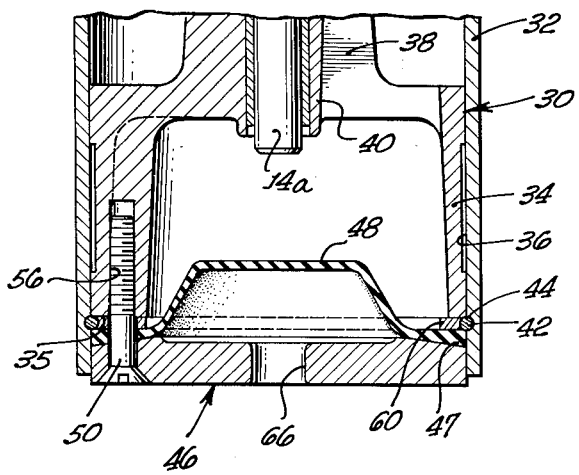
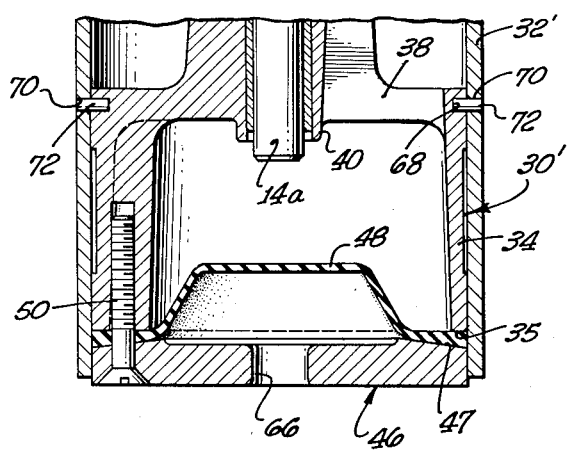
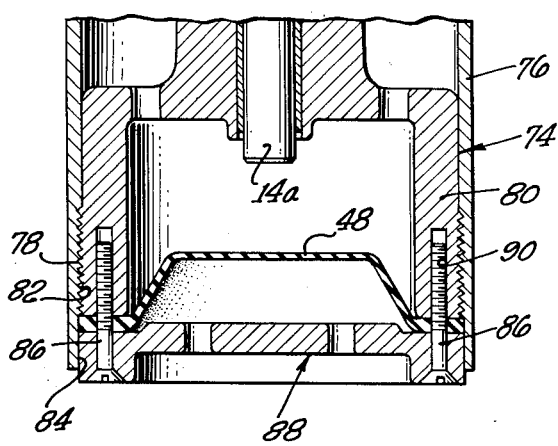
ALBERT REDDING, JR.
INVENTOR.
BY Flam and Flam
ATTORNEYS.

United States Patent Office 3,050,645
Patented Aug. 21, 1962

3,050,645
SUBMERSIBLE MOTOR STRUCTURE
Albert Redding, Jr., South Gate, Calif., assignor to U.S. Electrical Motors, Inc., Los Angeles, Calif., a corporation of California
Filed May 12, 1958, Ser. No. 734,555
10 Claims. (Cl. 310—87)

This invention relates to submersible motors, and particularly to a casing structure therefor.

The casing of a submersible motor must support stator laminations and also bearing brackets for a rotor. In the past, separate brackets have been affixed, as by bolts and gaskets, to a stator sleeve. In order to maintain a concentric relationship between the bracket bearings and the stator bore to achieve a uniform air gap between the stator and the rotor, reasonably close tolerances have been required as to the location of the fastening means between the brackets and the sleeve.

The primary object of this invention is to provide a simplified casing structure whereby this problem is avoided and whereby the number of machining operations is reduced. In carrying out this object, the outer shell and one end bracket are formed in a single piece, as by a casting process. Machining of the stator sleeve bore and the bearing recess in the end bracket is readily accomplished, as by a multiple spindle operation.

Another object of this invention is to provide a casing structure of this character in which the other end bracket is readily and adjustably accommodated. For this purpose, the end bracket which is affixed to the structure has external threads received telescopically within the open end of the shell.

Another object of this invention is to provide a structure of this character which includes simple provisions for pressure equalization whereby oil or other lubricant may be contained within the casing proper.

This invention possesses many other advantages, and has other objects which may be made clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGS. 3, 4 and 5 are fragmentary sectional views illustrating modified equalizing seal structures.

Figure 1:
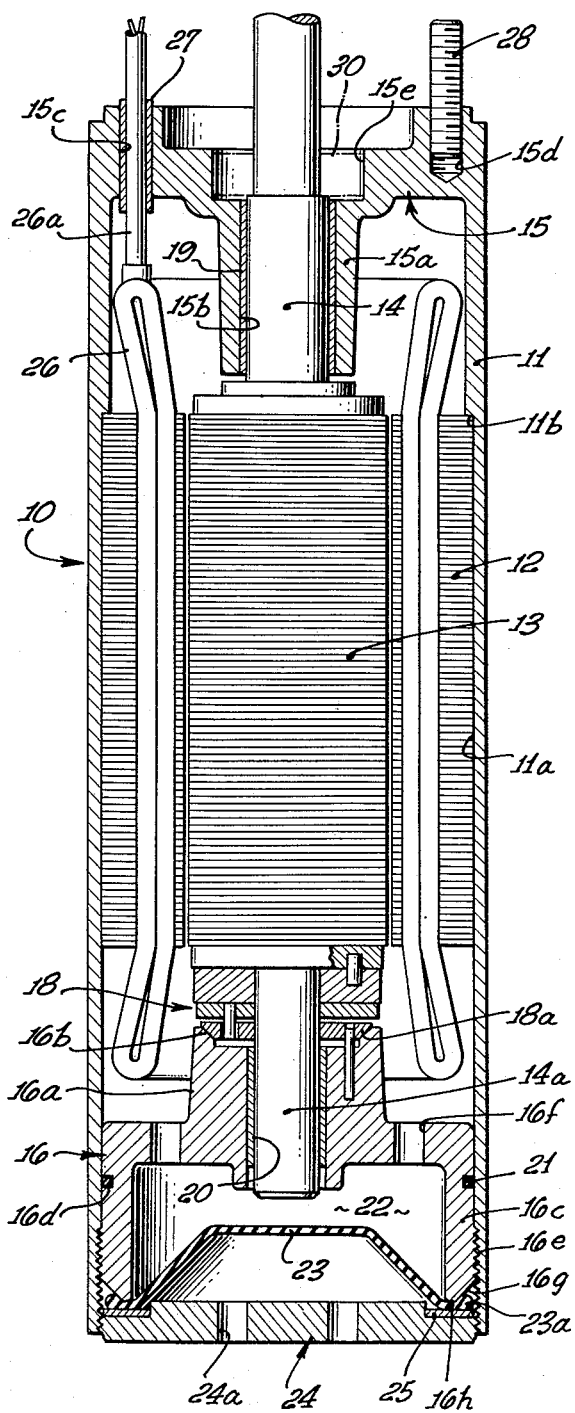
FIGURE 1 is a longitudinal sectional view of a submersible motor structure incorporating the present invention.

The motor 10 illustrated in FIG. 1 includes a casing shell 11 in which stator laminations 12 are secured. A rotor 13 has an operating shaft 14 projecting upwardly through a bearing support 15 at the upper end of the shell 11. A companion bearing support 16, at the other or lower end of the shell 11, provides a seat for a thrust bearing assembly 18 which supports the rotor and the load on its shaft 14.

Figure 2:
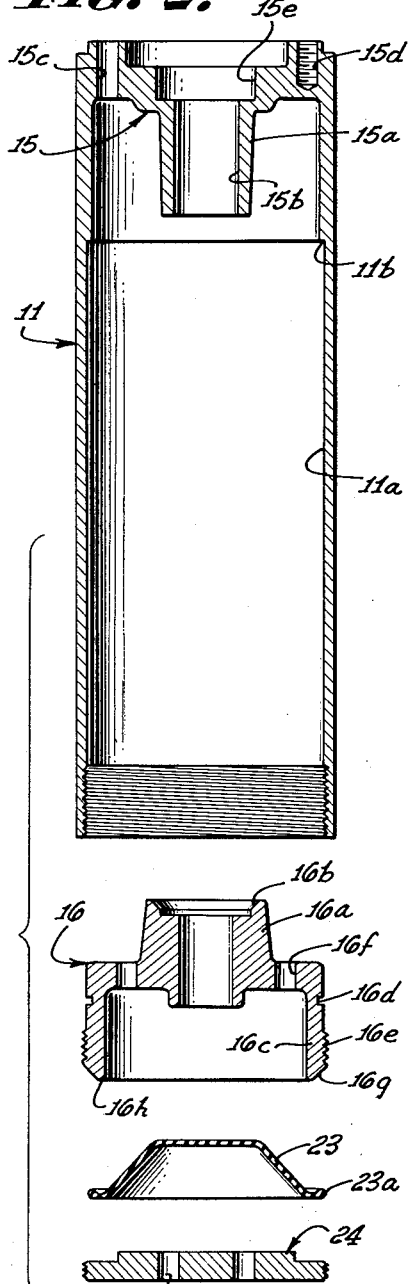
FIG. 2 is an exploded view illustrating the several parts of the casing structure proper.

As illustrated clearly in FIG. 2, the shell 11 and upper bearing support 15 are formed integrally, as by a casting process. The bearing support 15 has an inwardly extending boss 15a provided with a bore 15b for reception of a bearing sleeve 19 (FIG. 1) in which the rotor shaft 14 is journalled. The stator bore 11a and bore 15b can be formed by a multiple spindle machine, for example. During such operation, a shoulder 11b is formed to provide a stop for the stator laminations 12.

The lower bearing support 16 has a central, upwardly extending boss 16a provided with a bore for a sleeve bearing 20 in which the lower terminal portion 14a of the rotor shaft 14 is journalled. The boss 16a also provides a conical seat 16b for the lowest element 18a of the thrust bearing structure 18. A downwardly extending flange 16c of the support 16 is telescopically received within the lower open end of the casing shell 11. An O-ring 21, accommodated in the peripheral groove 16d of the flange 16c, provides a seal along the exterior surface of the flange 16c. The flange 16c is exteriorly threaded at its lower end, as at 16e, and the lower end of the stator bore 11a is interiorly threaded, whereby the support 16 is secured.

Lubricant may completely fill the motor 10. In order to avoid excessive loads on the seals, such as the O-ring 21, the pressure at the interior of the motor and the ambient pressure are equalized. For this purpose, the support flange 16c provides a pressure equalizing chamber 22. It is closed by a flexible diaphragm 23 which is subjected on its outer side to the ambient fluid. The chamber 22 communicates with the interior of the motor via one or more apertures 16f in the support 16. The diaphragm has a beaded edge 23a entering an annular space formed peripherally at the end of the flange 16c by a conical surface 16g thereof. A cap 24 clamps that portion of the diaphragm inwardly adjoining the beaded edge 23a against a rounded annular seat 16h at the end of the conical surface 16g. A washer 25 is interposed between the cap 24 and the diaphragm 23 and is retained on the cap by a central, raised portion of the cap. The cap 24 threads into the end of the stator bore 11a.

The cap 24 has one or more ports 24a whereby the pressure of ambient fluid is communicated to the lower side of the diaphragm 23. As the apparatus is lowered in a well, the pressure of ambient water increases, and the diaphragm 23 flexes upwardly and imposes the ambient pressure upon the fluid in the motor 10. The cap 24 acts as a lock nut for holding the support 16 in adjusted position. The cap 24 confines the beaded edge 23a against separation from the conical surface 16g.

Stator windings 26 have end leads 26a passing upwardly through an opening 15c in the upper bearing support 15 for connection to an external circuit. A sleeve 27 provides a seal about the leads 26a.

Several studs 28, threaded into the bearing support 15, as at 15d, from the upper outer side, provide means for mounting the motor 10 to a pump or the like. The shaft 14 is accessible for connection to the pump rotor (not shown).

A suitable rotary seal for the shaft 14 and diagrammatically illustrated at 30 is accommodated at outer enlargements 15e of the boss bore 15b.

The bearing support 16 and the cap 24 being telescopically received within the shell, the uniform cylindrical peripheral configuration of the motor is maintained. This ensures that the motor can be positioned without obstacle within the well or well casing.

FIGS. 3, 4 and 5 show alternate arrangements for sealing the lower bearing support structures.

In FIG. 3, a lower bearing support 30 telescopes within the open end of the casing shell 32. The bearing support 30 includes a generally cylindrical flange 34 which peripherally fits the stator bore 36. Extending inwardly and upwardly from the flange 34 are a plurality of equiangularly spaced ribs 38 centrally supporting a hub portion 40 for the rotor shaft 14a.

In the present instance, and instead of threads, a spring retaining ring 42 locates the lower bearing support 30 relative to the shell 32. The ring 42 is accommodated in an annular groove 44 near the open end of the stator bore 36.

The support 30 is held against the retaining ring 42. For this purpose, a cap 46, fitted within the end of the bore 36, carries machine screws 50 which engage tapped recesses 56 opening at the end surface 35 of the support flange 34.

A reaction ring 60 fits within the retaining ring 42 and has a thickness substantially equal to the corresponding dimensions of the retaining ring. A substantial area is thus provided for engagement by the end surface 35 of the flange 34, and the reaction ring effectively supplements the limited area of the retaining ring 42. Furthermore, the reaction ring 60 provides an area for engagement by the marginal portions of a sealing diaphragm 48 interposed between the cap 46 and the support 30.

The marginal portions of the diaphragm 48 diverge outwardly; the inner annular surface 47 of the cap 46 which engages the outer margins of the diaphragm 48 is outwardly tapered to complement the divergence of the diaphragm. Accordingly, upon movement of the cap 46 inwardly, the marginal portions of the diaphragm 48 tend, by virtue of this wedging relationship, to engage the stator bore 36 adjacent the retaining ring 42 to establish an appropriate seal.

The reaction ring 60 is, by compression of the marginal portions of the diaphgram 48, urged frictionally into engagement with the end surface 35 of the bearing support flange 34. This frictional engagement ensures against rotation of the bearing support 30 relative to the cap 46. Frictional engagement between the marginal portions of the diaphragm 48 and the inside of the stator sleeve 32 and the cap surface 47 ensures against rotation of the cap 46 relative to the stator sleeve 32. Accordingly, the structure is held against rotation.

The cap 46 has a central opening 66 that communicates the ambient fluid to the under side of the diaphragm 48. Accordingly, appropriate equalization of pressure is ensured. The spaces between the ribs 38 ensure communication between the inside of the bearing support flange 34 and the other areas within the casing shell 32.

In the form illustrated in FIG. 4, a lower bearing support 30' is provided that is identical to the bearing support 30 illustrated in the previous forms, except that there are provided a series of recesses 68 opening outwardly at the upper portions of the flange 34. These outwardly opening recesses 68 register with apertures 70 in the wall of the casing shell 32'. Pins 72 are driven through the apertures 70 and into the recesses 68 in order properly to position the bearing support 30'. The pins fit sufficiently closely to establish their own seals.

In the present instance, a retaining ring, such as 42, is not necessary, and the end surface 35 of the bearing support flange 34 provides area accessible to the marginal portions of the diaphragm 48. Accordingly, these marginal portions of the diaphgram 48 are directly clamped against the end surface 35 of the flange 34. The cap 46 serves this function, and it is urged toward the flange 34 by the aid of the machine screws 50.

In the form illustrated in FIG. 5, a lower bearing support 74 is provided that, as in connection with the form illustrated in FIGS. 1 and 2, is threadedly received within the casing shell 76. However, by starting the threads inwardly of the end of the stator bore, a simple seal is made possible.

Peripheral threads 78 at the lower end of the bearing support flange 80 engage internal threads 82 formed at the lower end of the casing shell 76. The internal threads 82 on the casing shell 76 adjoin and project inwardly of an annular surface 84. The upper end of the casing shell threads 82 are unrelieved so that the threads 78 on the bearing support 74 tighten. At this position, only the annular surface 84 and no portions of the threads 82 are accessible beneath the end surface of the bearing support flange 80. The marginal portions of the diaphragm 48 accordingly can annularly engage the surface 84 to establish a seal. A cap 88 expands the marginal portions of the diaphragm 48 for this purpose. Machine screws 86 enter tapped recesses 90 in the bearing support flange 80 and clamp this cap 88 in place.

The inventor claims:

1. In a motor structure: an integral hollow member open at one end and having a wall at the other end, said wall having an aperture passing through the wall in which a bearing is adapted to be supported; a stack of stator laminations secured in the member; a rotor having a shaft extending through the aperture; said member having internal threads at its open end; a bearing supporting member having peripheral threads and telescopically received in the open end of said member, and having provisions for supporting the rotor; said bearing supporting member having a flange extending toward the open end of said member, and defining a chamber in communication with the interior of said hollow member; a flexible wall adjacent the end of said flange; a ported cap threadedly received at said open end of said hollow member and clamping the edges of said flexible wall into sealing relationship with said flange, and holding said supporting member in adjusted position; said wall having provisions for supporting a rotary seal for said shaft.

2. In a motor structure: a casing shell of uniform diameter, having an open end interiorly threaded; a bearing support telescopically received within said end of said shell and having threads engaging the threaded end of said shell; said bearing support having means forming an annular seat spaced inwardly from its peripheral portion; a flexible wall annularly engaging said seat; and a cap member threadedly engaging the end of said shell and urging said flexible wall into engagement with said seat.

3. In a submersible motor having a rotor mounted on a shaft; a casing shell of uniform diameter; an apertured bearing support integrally formed with the shell and adjacent one end thereof; the other end being open; the aperture and the shell having a common axis; said shaft extending through the aperture; a second bearing support for the shaft at the other end of the casing shell; said second bearing support having a flange directed outwardly of the shell and telescoping within the shell; a bearing structure carried by said second support, and engaging the periphery of the shaft; a flexible impervious wall covering the flange; a cap clamping the edge of the wall to the edge of the flange, and telescoping into the shell said wall defining a chamber with the interior of the flange, the second bearing support having an opening connecting the chamber with the interior of the shell; said second bearing support carrying external threads that engage corresponding internal threads of the shell; said cap having an outer cylindrical surface telescoping in a terminal cylindrical surface of the shell; and screws attaching the cap to the edge of the flange.

4. In a motor structure: a casing shell of uniform diameter and having an open end; a bearing support, having a peripheral portion telescopically mounted within said casing adjacent said end and mating with the interior surface of said shell, and having an end annular surface; a cap member mounted within said open end; said cap member and annular surface being juxtaposed; a diaphragm having marginal portions interposed between said cap member and annular surface within said shell; and means for clamping said marginal portions between said cap member and annular surface and fixing said support, cap member and diaphragm against movement relative to said shell.

5. In a motor structure as set forth in claim 4, said clamping and fixing means comprising external threads on said bearing support and cap member, and mating internal threads on said shell.

6. In a motor structure as set forth in claim 4, said clamping and fixing means comprising a retaining ring carried on the internal surface of said shell and sandwiched between said bearing support and said cap member, and means affixing said cap member to said bearing support.

7. In a motor structure as set forth in claim 4, said clamping and fixing means comprising pin means affixing said bearing support to said casing, and means affixing said cap member to said bearing support.

8. In a motor structure as set forth in claim 4, said clamping and fixing means comprising an internal thread on said shell mating with an external thread on said bearing support, and means affixing said cap member to said bearing support.

9. In a motor structure as set forth in claim 4, the end of said casing shell opposite from said open end having a second bearing support formed integrally with the shell.

10. In a motor structure as set forth in claim 4, the last-mentioned means including internal threads on said shell mating with external threads on said bearing support, and said motor structure further including a thrust bearing structure carried by said bearing support and adjustable axially by means of the threaded engagement of said bearing support with said shell.

References Cited in the file of this patent

UNITED STATES PATENTS

| | | |
|---|---|---|
| 2,246,751 | Nelson | June 24, 1941 |
| 2,739,252 | Patterson et al. | Mar. 20, 1956 |
| 2,786,952 | Pleuger | Mar. 26, 1957 |
| 2,829,288 | Shaefer | Apr. 1, 1958 |

FOREIGN PATENTS

| | | |
|---|---|---|
| 1,127,320 | France | July 11, 1955 |